June 9, 1953 J. D. KINNEAR, JR 2,641,298
METHOD AND APPARATUS FOR APPLYING SEEDS TO CARRIERS
Filed Sept. 22, 1949 2 Sheets-Sheet 1
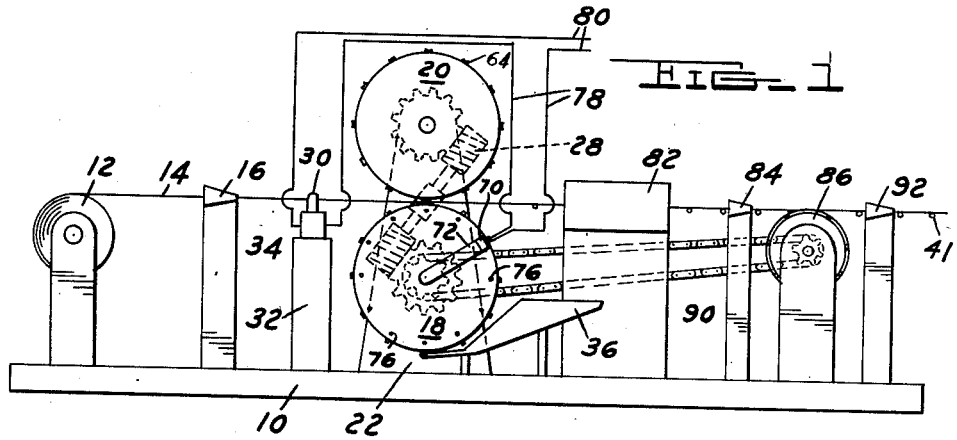
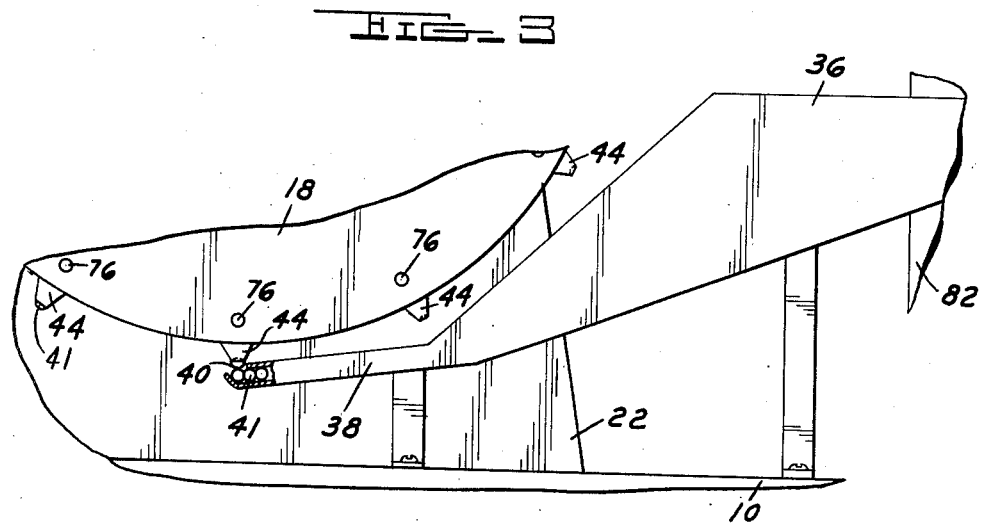
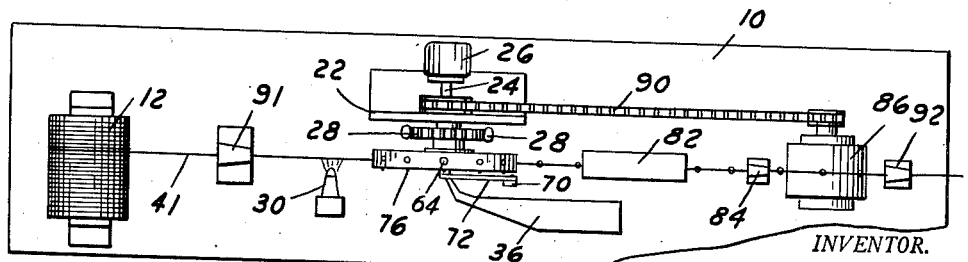
INVENTOR.
JOSEPH DOUGLAS KINNEAR JR.
BY
Barnes, Kisselle, Laughlin & Raisch
ATTORNEYS June 9, 1953 — J. D. KINNEAR, JR — 2,641,298
METHOD AND APPARATUS FOR APPLYING SEEDS TO CARRIERS
Filed Sept. 22, 1949 — 2 Sheets-Sheet 2
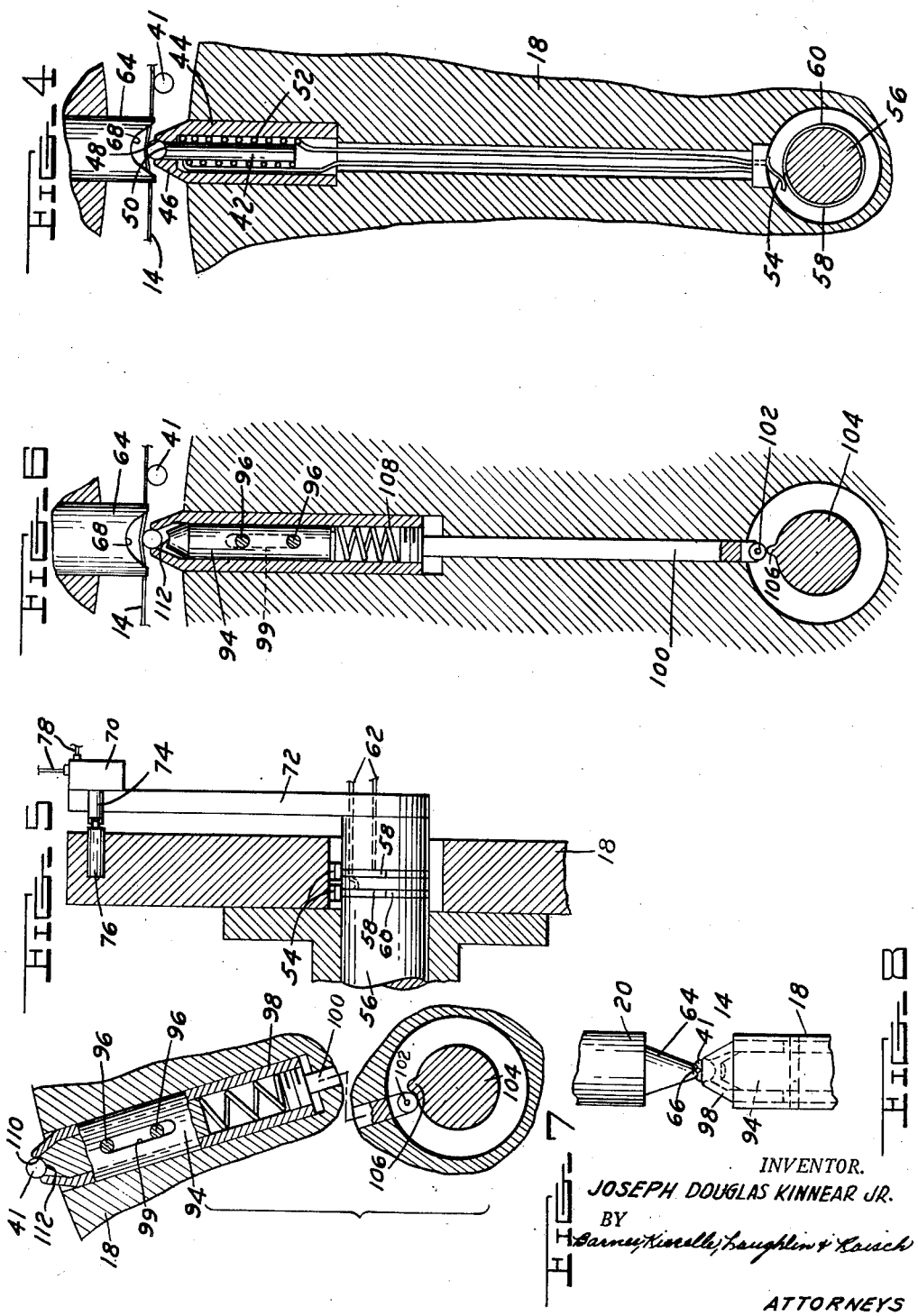
INVENTOR.
JOSEPH DOUGLAS KINNEAR JR.
BY
Barney, Kinsella, Laughlin & Rauch
ATTORNEYS Patented June 9, 1953

2,641,298

UNITED STATES PATENT OFFICE 2,641,298

METHOD AND APPARATUS FOR APPLYING SEEDS TO CARRIERS

Joseph Douglas Kinnear, Jr., Detroit, Mich.

Application September 22, 1949, Serial No. 117,249

20 Claims. (Cl. 154—1.6)

This invention relates to a method and apparatus for applying seeds to a carrier member, such as a cord or tape.

It is an object of this invention to provide a method of securing seeds in a pelleted form to a carrier, such as a cord or a tape, which lends itself to high speed production and which can be performed with relatively simple apparatus.

A further object of the invention resides in the provision of an apparatus for securing pelleted seeds to a cord or the like which utilizes magnets for picking up the seeds and depositing them on the carrier member.

In the drawings:

Figure 1 is a diagrammatic side elevation of the apparatus for applying pelleted seeds to a cord.

Figure 2 is a top view of the apparatus shown in Figure 1.

Figure 3 is a fragmentary side elevation of the apparatus on an enlarged scale.

Figure 4 is a fragmentary sectional view of the seed wheel and idler wheel of the preferred form of construction.

Figure 5 is a fragmentary sectional view through the seed wheel.

Figure 6 is a fragmentary sectional view similar to Figure 4 showing a modified form of construction.

Figure 7 is a fragmentary sectional view similar to Figure 6 but showing the parts at a different stage of the operation.

Figure 8 is a fragmentary end view of the seed wheel and idler wheel of the modified form of construction.

In the preparation of seeds for planting, various processes have been adopted for facilitating the planting operation as well as for insuring a high yield of crop. It has heretofore been proposed to secure the seeds onto a cord, tape, or the like, at regularly spaced intervals so that an entire row may be planted by simply stretching the cord carrying the seeds and covering it with earth to the desired depth. Although seed tapes of this type have been used with some success, their use on a wide commercial scale has not been adopted because of the difficulty of applying the seeds to the tape and because of the high cost of the seed tapes themselves. The difficulty encountered in the manufacture of such tapes lies in the ability to transfer the seeds from a hopper onto a moving tape at regularly spaced intervals. Various mechanical devices including suction tubes and the like have been employed, but such processes have for one reason or another not met with wide commercial success.

More recently it has been proposed to embed a seed in a pellet, the seed being surrounded by fertilizer and other materials in pelleted form which protects the seed and insures its proper growth. Pelleted seeds of this type because of their size, lend themselves more readily to attachment to a tape or a cord, and it is with this type of seed that the present invention relates.

I have found that pelleted seeds can be applied to a tape or the like very efficiently, and by means of a relatively simple apparatus, if the seeds are rendered capable of being attracted and held by a magnet. Such seeds may be produced by simply incorporating in the pelleting material a magnetic material which has no deleterious effect on the seed or its growth. As an example, a fine particulate material, such as iron filings, may be employed. If a sufficient amount of magnetic material is incorporated in the pelleted seed, then an arrangement of magnets may be employed for picking up the seeds from a hopper and depositing them on a moving carrier, such as a cord or a tape.

Referring to the drawings, and particularly to Figures 1 through 3, there is illustrated an apparatus for applying pelleted seeds containing a magnetic material onto a cord or the like. The apparatus preferably includes a base 10 at one end of which is mounted a spool 12 from which the cord 14 is adapted to be unwound. Cord 14 is unwound from reel 12 at a uniform rate onto a wind up reel (not shown) by apparatus which will be presently described: As the cord 14 unwinds from reel 12, it passes through a guide 16 which aligns the cord with a seed wheel 18 and an idler wheel 20. Wheels 18 and 20 are mounted on base 10, one above the other by means of a standard 22. Wheel 18 is connected by a shaft 24 with a motor 26 so as to be driven thereby at the desired speed. The speed of motor 26 is controlled so that the lineal speed of wheel 18 is the same as that of cord 14. Idler wheel 20 is arranged to be driven at the same speed as wheel 18 but in the opposite direction by means of a helical gear drive 28.

The pelleted seeds are secured to the cord by means of a suitable adhesive, and there is accordingly provided a stationary spray nozzle 30 which is positioned adjacent the path of cord 14. Nozzle 30 is connected to a pressure reservoir 32 containing liquid adhesive through a solenoid valve 34. Valve 34 is operated intermittently so as to apply a small quantity of adhesive on the moving cord at regularly spaced intervals.

Adjacent the lower run of the wheel 18 there is positioned a hopper 36, the lower end of which is provided with a tubular funnel 38, having an opening 40 of sufficient size to pass one pellet at a time. Opening 40 is disposed directly beneath the periphery of wheel 18 and funnel 38 is inclined downwardly toward opening 40 so that the pelleted seeds will gravitate toward the opening. The pelleted seeds 41 are aranged to be picked up by wheel 18 by means of electromagnets 42, which project outwardly and radially of wheel 18 at regularly spaced points around the periphery of the wheel. Magnets 42 are surrounded by a sleeve 44 formed of a non-magnetic material, such as brass, the sleeves having a tapered nose 46 at their outer ends which is provided with an aperture 48 having a diameter slightly less than that of the pelleted seeds. Magnet 42 extends axially of sleeve 44 and has a shallow spherical pocket 50 at the outer end thereof which cooperates with opening 48 in nose 44 to form a socket in which the seed is adapted to be seated. Each magnet is energized by a coil 52, the leads of which extend radially inwardly to the center of wheel 18 and are connected to a pair of brushes 54. A stationary shaft 56, on which a wheel 18 is mounted to rotate, is provided with a pair of semi-circular slip rings 58, the ends of which are bridged by a semi-circular insulating segment 60. Slip rings 58 are connected to a suitable source of electric current by conductors 62. Rings 58 are positioned on shaft 56 so that the circuit through coil 52 of each magnet is energized as the magnet approaches opening 40 and is de-energized at a point spaced substantially 180° from opening 40. Motor 26 rotates wheel 18 in a clockwise direction as viewed in Figures 1 and 3 and wheel 20 therefore rotates in a counter-clockwise direction. As each magnet passes over opening 40 it attracts the lower most pellet in funnel 38. The magnets are designed of sufficient strength so that the seed will pop up through opening 40 and set itself in the opening 48 in sleeve 44. The provision of sleeve 44 prevents more than one pellet from becoming attached to each magnet as the magnet passes the opening.

Around the periphery of idler wheel 20, there are inserted a plurality of guides 64 which are spaced apart to correspond with sleeves 44. The arrangement is such that as sleeves 44 approach a vertical position, wheel 20 presents a guide 64 diametrically opposed to the sleeve. Each guide is provided with a circumferential groove 66 which engages the moving cord 14 and with a transversely extending depression 68.

Valve 34 is operated intermittently so as to apply a small quantity of adhesive to cord 14 at regularly spaced intervals by means of a microswitch 70 which is mounted at the end of an arm 72, switch 70 having a movable contact 74 which is engaged by projections 76 mounted on the face of wheel 20 at points corresponding to the circumferential spacing of magnets 42. Switch 70 and valve 34 are connected by a circuit 78 with a supply line 80, the arangement being such that as each projection 76 contacts the movable contact 74 of switch 70, the circuit through valve 34 is momentarily closed and a quantity of ahesive is sprayed on cord 14.

In order to set the adhesive, a suitable heating element 82 is provided through which cord 14 passes after the seeds have been applied thereto. After the cord passes through heater 82, it travels through a guide 84 and onto an idler drum 86, which is driven from wheel 18 by a sprocket and chain drive 90 so as to have the same lineal speed as cord 14. Cord 14 makes one turn around drum 86 and then travels through a further guide 92 and to a winding reel (not shown).

From the above description, the operation of my apparatus becomes obvious. Seeds 41 gravitate to the lower end of funnel 38 and as each magnet approaches opening 40, its brushes 54 make contact with slip rings 58 to energize the magnet. As the magnet passes over opening 40, a seed pops into the socket at the end of nose 46 of sleeve 44 and is carried upwardly in a clockwise direction by the magnet. When the magnet reaches the vertical position between the two wheels, the seed retained thereby is brought into contact with cord 14 just as brushes 54 pass over the trailing end of slip rings 58. Sleeve 44 is positioned such that the seed produces a slight deflection of cord 14 between groove 66 on guides 64 so as to insure a firm adhesion between the seed and the cord.

In Figures 6 through 8, I have shown a seed wheel employing permanent magnets instead of electromagnets. The permanent magnets 94 are fixedly mounted on wheel 18 by a pair of pins 96. Each magnet is surrounded by a radially reciprocable sleeve 98. Each sleeve is provided with an elongated slot 99 through which pins 96 extend to limit the extent of reciprocal movement of the sleeve. At their inner ends, sleeves 98 are each connected with a push rod 100 having a roller 102 at the end thereof. The stationary shaft 104 on which wheel 18 is mounted, is fashioned with a cam 106 on the upper side thereof. A spring 108 biases sleeve 98 to the retracted position so that the opening 110 on the nose of sleeve 98 cooperates with the seat 112 at the end of magnet 94 to form a socket for the seed. Cam 106 is positioned on shaft 104, such as to actuate push rod 100 outwardly when the magnet reaches the upright position where it is opposite one of the guides 68 on the wheel 20.

The operation of the device employing permanent magnets is in general substantially the same as the seed wheel having electromagnets. As each magnet passes over opening 40 in funnel 38, it draws out one seed and carries it in an upwardly and clockwise direction to an upright position, where the magnet is diametrically opposed to one of the guides 64 on the idler wheel 20. When the magnet reaches this position, roller 102 engages cam 106 to push sleeve 98 outwardly and thereby move the seed 41 outwardly and away from the seat 112 at the outer end of magnet 94. The attraction between the magnet and the seed is thereby substantially reduced so that the seed will adhere to the cord to which adhesive has been previously applied by nozzle 34. As soon as the magnet passes out of registration with guide 64, roller 102 rides off the tail end of cam 106 and sleeve 98 is returned to the retracted position by spring 108.

It will thus be seen that I have provided a method by which pelleted seeds can be applied to a moving cord in an economical and relatively simple manner. It will also be noted that the apparatus I have provided for applying seeds to the cord, is of simple construction and nevertheless is capable of operating at a high speed without the danger of its component mechanism falling out of synchronization.

I claim:

1. The method of securing a pelleted seed to a carrier member which comprises incorporating a magnetic material in the pelleted seed, bringing the seed into contact with a magnet so that the seed adheres to the magnet, applying an adhesive to a length of carrier member and moving the magnet relative to the carrier member so as to bring the seed retained by said magnet into contact with the adhesive on said carrier member.

2. The method of securing a pelleted seed to a carrier member which comprises incorporating a magnetic material in the pelleted seed, bringing the seed into contact with a magnet so that the seed adheres to the magnet, applying an adhesive to a length of carrier member, moving the magnet relative to the carrier member so as to bring the seed retained by said magnet into contact with the adhesive on said carrier member and releasing the seed from the magnet so that it adheres to said carrier member.

3. The method of securing a pelleted seed to a carrier member which comprises incorporating a magnetic material in the seed, feeding a quantity of the pelleted seeds containing magnetic material, one at a time, to a plurality of magnets, applying an adhesive to said carrier member and thereafter relatively moving said carrier member and said magnets to contact the seeds with, and deposit them on the adhesive portions of said carrier member at spaced intervals.

4. The method of securing pelleted seeds to a carrier member which comprises incorporating a magnetic material within the seeds when the seeds are pelleted, bringing said seeds into contact with a magnet so that the seeds become adhered to the magnet and thereafter depositing said seeds from said magnets and adhesively securing them onto a length of said carrier member.

5. The method of securing pelleted seeds to a carrier member which comprises incorporating a magnetic material in the seeds, bringing said seeds into contact with a magnet so that the seeds become adhered to the magnet, and thereafter depositing said seeds from said magnets onto a length of said carrier member to which an adhesive has been previously applied.

6. The method of applying pelleted seeds to a carrier member which comprises incorporating a magnetic material within the seed when the seed is pelleted, bringing the seed into contact with a magnet so that it will adhere to the magnet, moving said magnet to a position wherein the seed is aligned with the carrier member and thereafter releasing the seed from said magnet so as to deposit the seed on said carrier member and providing said carrier member with means for holding the seeds deposited thereon in relatively fixed and spaced relation.

7. The method set forth in claim 6 including the step of applying an adhesive to the carrier member prior to depositing the seed on said carrier member.

8. The method of applying pelleted seeds to a carrier member which comprises incorporating a magnetic material in said seeds so as to render them magnetic, feeding said seeds containing magnetic material, one at a time, to a plurality of electromagnets, moving said magnets so as to position the seeds in alignment with a carrier member and thereafter de-energizing said magnets to deposit said seeds on said carrier member.

9. The method set forth in claim 8 including the step of applying an adhesive material to said carrier member prior to depositing said seeds on said carrier member.

10. An apparatus for securing pelleted seeds containing a magnetic material to a carrier member comprising a seed receptacle having an outlet, means for successively moving a plurality of magnets along a path adjacent said outlet to enable each magnet to pick up a seed as it passes said outlet, said last-mentioned means also being arranged to successively position said magnets such that the seed is brought into contact with a moving carrier member, and means for releasing said seed from said magnet so as to deposit the seed on said carrier member.

11. The combination set forth in claim 10 including means for applying an adhesive to said carrier member at a point in its path of movement prior to its contact with the seeds.

12. The method of applying pelleted seeds to a carrier member which comprises incorporating a magnetic material in said seeds so as to render them magnetic, feeding said seeds containing said magnetic material, one at a time, to a plurality of magnets, moving said magnets and carrier member into alignment, applying an adhesive material at time intervals to said carrier member, depositing said seeds from said magnets to said carrier member and synchronizing the movement of said carrier member and said magnets and the application of said adhesive such that the seeds are deposited on the portions of the carrier member to which adhesive has been applied.

13. An apparatus for securing pelleted seeds containing magnetic material to a carrier member which comprises a seed receptacle, a plurality of magnets, means for moving said magnets along an endless path, said receptacle being positioned adjacent the path of said magnets such that as each magnet passes said receptacle, it picks up one seed, a carrier member positioned adjacent another point in the path of movement of said magnets, means for moving said carrier member at the same lineal speed as said magnets, and means for releasing said seeds from said magnets so as to deposit them on said carrier member when the magnets reach said other point in their path of movement.

14. An apparatus for securing pelleted seeds containing magnetic material on a carrier member comprising a plurality of magnets, means for moving said magnets along an endless path past a receiving station and a discharging station, a receptacle at said seed receiving station, means for moving a carrier member along a path adjacent said discharging station, said magnets being arranged to pick up a seed as they pass said seed receptacle at said seed receiving station and position the seed in alignment with said moving carrier member at said seed discharging station and means for releasing said seeds from said magnets when the magnets reach said discharging station.

15. The combination set forth in claim 14, wherein said magnets are of the electromagnetic type, said last-mentioned releasing means comprising means for de-energizing said magnets.

16. The combination set forth in claim 14 including a sleeve of a non-magnetis material surrounding each of said magnets, said sleeves each having an opening therein normally positioned adjacent a pole of the enclosed magnet, said opening being smaller in size than the seeds to be picked up by the magnets, said last-mentioned releasing means comprising means for producing relative movement of said sleeve and magnet so that the pole of the magnet is removed from adjacent said opening to thereby release the seed retained in said opening from attraction by said magnet.

17. The combination set forth in claim 14 including means for applying an adhesive material to said carrier member in advance of said discharge station and means for intermittently operating said adhesive applying means in timed relation with the movement of said magnets.

18. An apparatus for applying pelleted seeds containing magnetic material to a carrier member comprising a support, a plurality of magnets arranged radially on said support to rotate in a single plane, said magnets each having a pole at their outer ends, said poles being arranged to travel in a circumferential path, said outer ends of said magnets being shielded with a non-magnetic material to expose only a sufficient portion of said magnet to retain one pelleted seed at the end of said magnet, said circumferential path having a seed receiving station and a seed discharging station, a receptacle at said seed receiving station for presenting pelleted seeds containing a magnetic material to the outer ends of said magnets as they travel past said receiving station, means for moving a carrier member along a path adjacent said seed discharging station and means for releasing the seeds from the ends of the magnets as the magnets travel past said discharging station to deposit the seeds, one at a time, on said carrier member.

19. The combination set forth in claim 18 wherein said magnets are of the electro-magnetic type, said last-mentioned releasing means comprising means for intermittently de-energizing said magnets.

20. The combination set forth in claim 18 wherein said non-magnetic shields comprise sleeves surrounding each of said magnets and having an opening in the end thereof adjacent the outer ends of said magnets, said opening being smaller than the seeds, said magnets and sleeves being movable relative to each other, said last-mentioned releasing means comprising a cam for producing relative movement of said magnets and sleeves.

JOSEPH DOUGLAS KINNEAR, Jr.

References Cited in the file of this patent

UNITED STATES PATENTS

| Number | Name | Date |
|---|---|---|
| 614,002 | Jenkins | Nov. 8, 1898 |
| 1,319,157 | Lingle | Oct. 21, 1919 |
| 1,329,900 | Hanington | Feb. 3, 1920 |
| 1,616,138 | Porter | Feb. 1, 1927 |
| 1,652,855 | Fernandez | Dec. 13, 1927 |
| 1,755,926 | Leguillon et al. | Apr. 22, 1930 |
| 2,313,057 | Fischer | Mar. 9, 1943 |
| 2,338,103 | Fischer | Jan. 4, 1944 |
| 2,411,559 | Sonin et al. | Nov. 11, 1946 |
| 2,502,809 | Vogelsang | Apr. 4, 1950 |

FOREIGN PATENTS

| Number | Country | Date |
|---|---|---|
| 207,886 | Great Britain | Dec. 7, 1923 |
| 261,426 | Italy | May 7, 1928 |